US008608936B2

(12) United States Patent
Skomsvold (10) Patent No.: US 8,608,936 B2
(45) Date of Patent: Dec. 17, 2013

(54) DEVICE AND METHOD FOR PRODUCTION OF HYDROGEN

(76) Inventor: Åge Jørgen Skomsvold, Tonsberg (NO)

( * ) Notice: Subject to any disclaimer, the term of this patent is extended or adjusted under 35 U.S.C. 154(b) by 855 days.

(21) Appl. No.: 12/602,250

(22) PCT Filed: Jun. 2, 2008

(86) PCT No.: PCT/NO2008/000194
§ 371 (c)(1),
(2), (4) Date: Jun. 15, 2010

(87) PCT Pub. No.: WO2009/145635
PCT Pub. Date: Dec. 3, 2009

(65) Prior Publication Data
US 2010/0243469 A1 Sep. 30, 2010

(30) Foreign Application Priority Data

May 31, 2007 (NO) .................................... 20072793

(51) Int. Cl.
*C25B 1/02* (2006.01)
*C25B 1/04* (2006.01)
*C25C 7/00* (2006.01)

(52) U.S. Cl.
USPC ........... 205/637; 205/628; 204/274; 204/278; 204/275.1

(58) Field of Classification Search
USPC .................. 205/628–639; 204/278, 213, 212
See application file for complete search history.

(56) References Cited

U.S. PATENT DOCUMENTS

| 3,790,464 A * | 2/1974 | Greaves ........................ 204/212 |
| 4,581,105 A | 4/1986 | Chao et al. |
| 7,553,398 B2 * | 6/2009 | Surikov et al. ................ 204/241 |

FOREIGN PATENT DOCUMENTS

| DE | 2819740 | 11/1979 |
| EP | 0161680 | 11/1985 |
| EP | 0073434 | 11/1986 |
| GB | 1399898 | 7/1975 |
| JP | 56-096084 | 8/1981 |
| JP | 2003088866 | 3/2003 |
| RU | 2004072328 | 8/2004 |
| WO | 2007058555 | 5/2007 |

(Continued)

OTHER PUBLICATIONS

European Patent Office, "Supplementary European Search Report for EP 06835700", Jun. 2, 2009, Publisher: European Patent Office, Published in: EP.

(Continued)

*Primary Examiner* — Nicholas A Smith
*Assistant Examiner* — Brian W Cohen
(74) *Attorney, Agent, or Firm* — Blanchard & Associates (57) ABSTRACT

A device for producing hydrogen in an electric field includes a shaft rotationally coupled via bearings to a vacuum protection housing, which encloses a disc like structure fastened to the shaft that supplies a split medium provided through inlet channels situated at one longitudinal end of the shaft to split cells arranged at a periphery of the disc like structure. Each split cell includes first and second electrodes. To the vacuum protection housing are fastened diffusor-spirals where a produced gas and a material residue from the split cells are provided through a plurality of nozzles, each of which is arranged inside one of the diffusor-spirals with minimal clearance between an outer wall of the nozzle and an inner wall of the associated diffusor-spiral. A rotation of the disk like structure is supported by a gas pressure generated by the produced gas emitted from the nozzles.

16 Claims, 1 Drawing Sheet

(56) References Cited

FOREIGN PATENT DOCUMENTS

| WO | 2007061319 | | 5/2007 |
| WO | WO 2007061319 A1 | * | 5/2007 |
| WO | 2007086796 | | 8/2007 |
| WO | 2008088225 | | 7/2008 |

OTHER PUBLICATIONS

International Searching Authority, "Written Opinion of the International Searching Authority for PCT/NO2008/000194", Jan. 22, 2009, Publisher: International Searching Authority, Published in: World Intellectual Property Organization.

* cited by examiner

DEVICE AND METHOD FOR PRODUCTION OF HYDROGEN

FIELD OF THE INVENTION

The present invention is related to production of clean hydrogen gas at high pressure or in liquefied form.

TECHNICAL BACKGROUND

Today it is very energy demanding to produce hydrogen, when the whole energy accounts are estimated from raw material too compressed or liquefied hydrogen. With today's technology the hydrogen will be 20-30% more expensive than alternative fuel like gasoline, diesel etc. with the same energy content.

At the same time the most effective production units is large, complicated and expensive. They also demand frequent maintenance routines which is part of making produced hydrogen more expensive.

Today most of the hydrogen production is accomplished by steam reforming where the residue $CO_2$ gets out in to the atmosphere, which is climatic destroying. It is being researched on handling this problem and with known technology it will demand 20-30% equivalent the energy in hydrogen to depositing $CO_2$ in for example hydrocarbon reservoirs, where it can be extracted more hydrocarbons at the same time.

When heat is needed during the hydrogen production, it is researched on being able to recycle the thermal energy, which they have managed at MIT with totally 95%.

In an earlier Norwegian patent application 20064407 it is described a device and method for hydrogen production by electrolysis. The device contains a compact rotating hydrogen production unit which can deliver separated gas pressurized out of the device helped by regulating valves at the outlet of the device. However the regulating valves and the slip chambers established at the ends of the shafts could be exposed to quick wear, leaking and resistance.

SUMMARY OF THE INVENTION

The present invention provides a device and a method for production of hydrogen from a split medium such as water, electrolyte or hydrocarbons independent, or mixed, or helped by catalysts in an electric field, where produced $H_2$, $O_2$ and $CO_2$ is separated effective, where the gases have a higher pressure out of the device than the pressure on the split medium in to the rotating device. The device can also be reconnected as an engine.

According to the invention the devise is compact, effective and has a high production rate and a through current speed.

The advantages of the invention is because of the electrolysis cell is rotating in a way that the gases produced under high G condition. The high G means that the gas bubbles, which are produced by the splitting, gets small and rapidly get separated from the split medium. With that will sufficient of the split medium rapid turn and barely cover the electrodes all the time, why the device is formed with small electrodes but however produce gases with high trough current speed. The device is also constructed so it can be able to operate above super critical pressure and temperature (over 222 bar and 374° C.). Then each produced steam will have a much higher density than hydrogen and can be easily separated and very little or none oddment steam is left in the gases. The device deliver the gases at normal storing pressure and/or liquefied. The rotation is executed by the pressurized gases trough separated/jointed nozzles for each/gathered gas, to each/jointed spiral-diffusor(s) which is adapted so some or all the gases phase over to ice or liquid form, and the gases fractionizes out inside sections camber at evaporation order. Heat and cold which is produced during the process is recycled in and outside of the device. Recycled cold- or liquid inert gas could be added in adjusted proportions to the cell after the splitting to lower the temperature, and to prevent that the gases oxidizes. Inert gas has to be added in a much larger amount than the produced gas, and because of the heat the inert gas gets a higher pressure out which can be energy transformed with a energy transforming device, where the transformed energy could be added to the actual invention, for instance: some electricity to the electrodes, pressurizing of input substance and rotation. By adjusted amount inert gas such as the production gases is allowed to combust and where it can be added more fuel and oxygen in the combustion, can the energy transformation be increased and the device becomes a motor.

The content of the invention is defined in the appended claims.

SHORT DESCRIPTION OF THE DRAWING

The invention will now be described in detail in reference to the appended drawing, in which.

DETAILED DESCRIPTION OF THE INVENTION

Figure 1:
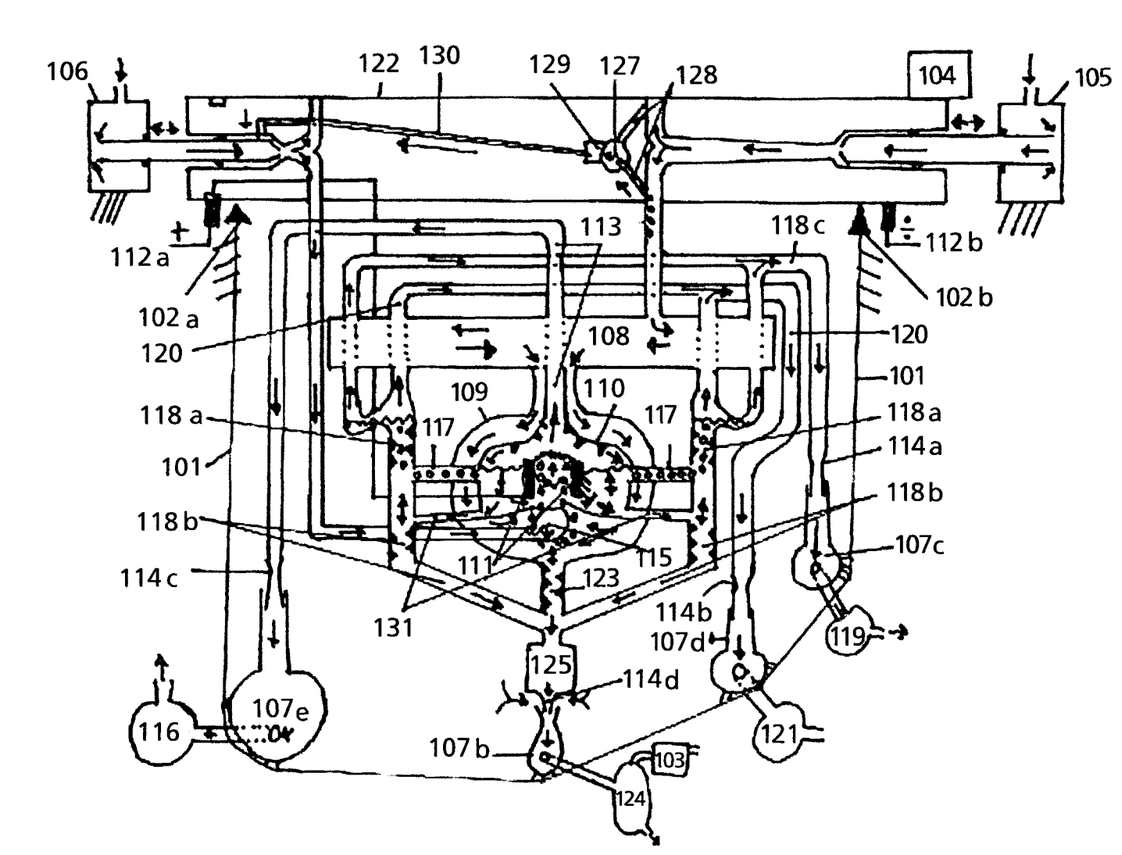
FIG. 1 show a execution form of the invention, where a longitudinal section of the shaft and one half of the rotation device, anchored vacuum house and diffusor-spiral is shown; the other half is a mirror imaging of the half structure witch is shown along the one side of the shaft.

FIG. 1 show the principle parts of the invention, namely a fast rotating hydrogen producing pressure unit which is suspended in an anchored vacuum house 101 with sealed bearings 102a, 102b placed at the ends of the shafts on the unit. The hydrogen producing unit contains an electrolysis cell 110 arranged at the periphery in the unit. The cell 110 is constructed to split water, electrolyte, hydrocarbons, or mixtures of this, which is supplied via channels in the shaft. To the vacuum house it is also fastened/anchored diffusor-spiral (as in centrifugal compressor) 107b-c-d-e, where produced gas and substance leavings from the cell 110 separates in own channels for each productions gas/substance to own nozzles 114a-b-c-d. The nozzles form a line/circle 114a-b-c-d on the rotation device/shaft for each production gas/substance and fitted inside said diffusor-spiral with little space between the outer wall on the nozzle and the inner wall on the diffusor. The gas pressure from the nozzle in the circle executes the rotation of the device. The unit can be rotated helped by an alternative motor 104 which can be connected on/off the shaft. Vacuum/low-pressure is established inside the protective evacuated housing 101 with a vacuum pump 103 where the air and/or gas is sucked out between a density regulating valve 114d and diffuser inner wall 107b in channel to a sediment accumulating tank 124 where the vacuum pump 103 with a set-back valve is connected with a channel. During the gas production will low pressure be created between the other nozzle circles 114a-b-c and theirs diffuser inner wall 107c-d-e which maintains vacuum/low pressure within the protective house 101. The vacuum prevents air resistance on the rotation unit, and isolates the unit against heat loss and noise. Recycling and adjusting of split medium from the cell 110 can be done via nozzles 114d and spiral diffusor 107b at periphery, where split medium is pressurized by dynamics, and the split medium is adjusted to the right temperature and mixture before it is pressed back in to the inlet 105. The split medium can also be leaded into an own channel (not drawn) from cell 110 in towards to shaft to an own nozzle-circle (this is mentioned later) and over to a diffusor-spiral. When the split medium from the cell got lower density than the split medium toward the cell, the pressure outlet will then be higher than the pressure at inlet, and then the split medium will give rotation force when the nozzles in the nozzle circle is adjusted backwards in the rotation direction. Or when the nozzles is more radial adjusted, the pressure is boosted more for farther deliverance to recycling as said.

When the rotation starts, the water/electrolyte will be high pressured pumped in to the injection nozzle 105, where the split fluid (for example water/electrolyte) is pumped through a needle nozzle with an attached Zimmer ring (for tightening) arranged in an adjusted channel in the centre of the axle ends. The fluid is injected as the injector principle into the shaft channel where the fluid is branch in to more sink channels along to a secondary heat exchanger 108 (where hot gases from the split cell gives heat to the fluid) and along to a main heat exchanger 109 (which is surround the split cell 110) and afterwards to the split cell 110. One of the electrodes 111 in the split cell 110 is supplied with DC electricity via an isolated conductor from contact 112a at one of the shaft ends and when the device is electric conductive one of the electrode could be in contact with the device and contact 112b on the other shaft end.

By using a electrolyte fluid to the cell 110, and with a low voltage between the electrodes 111, then produced hydrogen will float/rise towards the shaft and separates fast in to the hydrogen channel 113, through the secondary heat exchanger 108 and in the channel further to the nozzles 114c at the periphery where the hydrogen gas flows rapidly over to a diffusor-spiral 107e along to accumulating 116 pressurized and/or liquefied (depending on the pressure/temperature before the nozzle circle 114c and the pressure/temperature at the end of the diffusor-spiral 107e, and the same relation stands for all of the production gases independent of the production method). The nozzles in the nozzle circles 114a-b-c is adapted to regulate the pressure, rotation and the flow of the production gases to accumulating 119, 121, 116 via its diffusor-spirals 107c-d-e. Oxygen is taken out through channels 117 on the sides in the same levels as the top of the electrodes 111 out of the split cell 110 in a corresponding oxygen channels 117 through main heat exchanger 109 where afterwards the oxygen from each side is gathered in an oxygen channel 118a, through secondary heat exchanger 108, afterwards the oxygen channels 118a is gathered from each side into a common oxygen channel 118c which leads to each nozzle in the nozzle circle 114a at the periphery where the oxygen is pushed with a high speed into the diffusor-spiral 107c and to the accumulator 119 pressurized and/or liquefied/condensed. Hydrogen substances in the oxygen channel 118a is separated in to dedicated channels 120 via secondary heat exchanger 108, nozzle at the periphery 114b, diffusor-spiral 107d and accumulator 121. The pressure of the gases out of the oxygen channel 118a can be lower than the pressure on the hydrogen in the channel 113 from the cell 110, and then the level of water/steam will rise a bit up in the oxygen channel 118 a (above critical pressure) and when the level in the cell 110 is same with or below the corresponding oxygen channels 117 the gas substance from the cell 110 will then bubble or flow in to the oxygen channel 118a and liquid mediums from the cell will flow through the sediment channel 131 and when more water/steam/hydrocarbon-residue/$CO_2$-residue comes mixed and in better contact with a row of catalyzers to help catalyzing when its needed.

At water electrolysis, and at so high pressure that the $O_2$ becomes heavier than the electrolyte, the $O_2$ will then sink rapidly out to the periphery (Thus opposite way of $H_2$), and then it is being removed through density regulations valve 125 at the periphery, to the nozzle 114d where $O_2$ is hurled over to a diffusor-spiral 107b and along to accumulation 124 liquefied. Or the liquefied and the cold oxygen is leaded back to the rotation arrangement via the shaft and cooling down the $H_2$ before it is leaving the device, and the $H_2$ can also be liquefied this way and the $O_2$ can farther cool down the rotation arrangement to maintain strength. The liquid $O_2$ evaporates because of heating and could either be leaded out through a channel from the shaft axially to the diffusor, or radial to an own diffusor-spiral, with higher pressure then the $O_2$ had into the arrangement because of the density difference through the process as said. By using this method it is possible to achieve totally clean $H_2$ and $O_2$.

At heat splitting of pure water which is heated up by increasing the voltage/electric current between the electrodes 111 which can be made of nickel, zirconium, iridium, composite substance or nano technology material, or a combination of said materials. Chemicals/catalysts as electrolyte, iodides and bromides or equivalent material can also be added in the split medium at the input line from the nozzle 105 to reduce the split temperature. Hydrogen and oxygen is produced by the ionising and by the heat which is created. When the split medium (water) is added with material and catalyzers in the split cell to lower the split temperature (which can be relative low), the $H_2$ and $O_2$ will not react with each other (combust) when they leave catalysts and temperature diminished split limit in the water/steam, with that the production gases ($H_2$ and $O_2$ in this case) will be separated in the cell 110, and will be leaded out the same way as said over by electrolysis and electrolyte, and possible slag/sediments material or material with higher density than the water/steam is hurled out at the periphery via channels 118b, 123, 131 from the cell and oxygen channels 118a by a density regulating valve 125 and nozzle 114d out in the diffusor 107b and to accumulating 124. Nozzle 114d for slag material can be adjusted to allow slag material and some of the split material to pass. By this the density regulating valve 125 is less needed.

In both of the water electrolysis—and the heat split process the production gases $H_2$ and $O_2$ can be led out gathered/mixed (not drawn) via the rise channel 113 and the oxygen channel 117, or one of the said channels. To prevent oxidation of the production gases, they could be mixed with an inert gas, for example $CO_2$, which could be cooled down/liquefied, and can be added in a adapted amount in the line from the inlet 106 and to (now) inert gas distributor 115 where the gas rises along between the electrodes 111, or on the outer side of them, or in channels through the electrodes to adjust cooling and the inert gas comes out of the electrodes top, where the inert gas from each electrode is guided to each other over the production gases which will mixed with it in the cell 110. Or from an own channel at the shaft via the periphery and up to the inert gas channels in the electrodes 111, or to the cell 110, where the inert gas can be supplied to the top of the electrodes 111 in a high speed from a row of nozzles along the circle round the shaft, and which could be placed in a place on each side of the hydrogen channel 113 and between that channel and the oxygen channel 117. With an inert gas solution, it is less need for outlet channels on the side 117, 131 or from top 113 of the cell 110 with following connections. The pressure and temperature in the gas mixture is adjusted in a way that they from the end of the diffusor-spiral 107e where $CO_2$ is taken/fractionized out as ice, $O_2$ as liquid and $H_2$ as cold gas. Or the $CO_2$ and $O_2$ are pumped, in a liquid state, along for separation in evaporation order in module chambers for this purpose. The $H_2$, which is in a state of gas, can be compressed along from an end of the diffusor-spiral 107e.

In said solution for inert gas, the production gases can also be allowed to burn in the inert gas in cell, when the mixture relation is adjusted for it, and it can also be supplied adapted amounts of fuel and oxygen from the same area as said inert gas nozzles (electrodes or cell wall) to increase the capacity when the gases is led through the nozzles, turbine for energy transforming and the unit becomes a engine. When the water evaporation can be condensates back to the cell as said, it could be practically only inert gas, which can be $CO_2$, which after said turbine can condensate to liquid or dry ice, where some of it is pumped/leaded back to the cell liquefied or as a cold gas, so that some the inert gas is sealed in a circuit, and the residue is deposited. Said engine solution can also be combined with steam reforming as said below.

The rotation device can be front connected and/or after connected with an own cooling arrangement (not shown) to gain in some cases sufficient cooling-energy so that some of the production gases can be liquefied, or become ice or that gases like $O_2$ is fractionates out for further use in the invention. Said cooling arrangement can also be combined for cooling production from the actual invention for further effect.

In the steam reforming process it will be at the same time as water/steam (and other possible added favourable material for splitting) which is injected at high pressure via channels in to the split cell 110 from the nozzle 105, will hydrocarbons (cooled down or liquefied) be supplied simultaneous at high-pressure in the line which starts at the injection nozzle 106 (as the principle from the injection nozzle 105 from the opposite shaft end) with a needle nozzle which have a Zimmer ring mounted on it, and adjusted for the channel in the centre of the shaft 122 where the hydrocarbons is injected at a adapted amounts and pressure, in to the shaft channel where the hydrocarbons is ramified in to multiple sink channels which leads to the hydrocarbon distributor 115 in the primary heat exchanger 109, where a adapted amount is added to the water/steam (Which can be mixed with other materials for less split energy) in the split cell 110 under the electrodes 111, where water/steam and hydrocarbons in adapted among rise up between them, where adapted voltage/amperage between the electrodes will give both necessary up-heating and (which recycled) and ionizing at sufficient voltage/amperage. Some of the supplied hydrocarbons will oxidize with the oxygen from the oxygen electrode, which will increase the temperature further. With right catalyzers on/in the electrodes 111, the cell 110, the channels 113, 117, 118a-b, 123, 131 from cell 110, where catalyzers is adjusted for the current pressure and temperature, then will the split medium in the end be transformed into $H_2$ and $CO_2$ after ended water change reactions in said outlet channels from cell 110 where the temperature is adjusted with the heat exchangers 108, 109 where one of them also can enclose and cool down the said outlet channels from the cell 110, where some steam can condensate back to the cell 110. Most of the $H_2$ is separated out in the channel 113 from the split cell 110 where the channel is leaded along through the heat exchangers 109, 108 and could ramify to the nozzles 114c in the nozzle circles periphery (or an equal number of channels from the cell 110 as the numbers of nozzles in the current nozzle circle. The same alternative is for the other gases from $CO_2$/oxygen channel 118a) over to a diffusor-spiral 107e further to accumulating 116 pressurized and/or liquefied. From the cell 110 the other produced gases, hydrogen carbon residue, some water/steam and small residue of $H_2$ is led on both sides of the cell 110 over to a axially corresponding $CO/CO_2$ channel 117 (earlier corresponding oxygen channel) to $CO_2$ channel 118a-b (earlier oxygen channel) where residue in the mixture is catalysed/transformed to more $H_2$ and $CO_2$, where $H_2$ from both sides along the channel through the secondary heat exchanger 109 rises in to an own common channel 120 witch leads $H_2$ to the nozzle 114b, a diffusorspiral 107 and accumulating 121 pressurized and/or liquefied. The $CO_2$ and possible other spin-off-products is simultaneously leaded from a side channel on the top of the $CO_2$ channels 118a from both sides through a channel in heat exchanger to a common $CO_2$-channel which leads the $CO_2$ to the nozzle 114a along to the diffusor-spiral 107c to accumulating 119 pressurized and/or liquefied. Fluids or materials with higher density than the electrolyte/water/steam is removed through adjustable density difference regulating valves 125 alongside the periphery, to the following nozzles 114d where the material is hurled/pressed over in to a diffusor-spiral 107b and along to accumulating 124.

There can be more disc structures and/or electrodes on the same shaft with a common inlet channel 105 and outlet channels 113, 118c, 120 for each material connected together, except the slag nozzle 114d with the belonging diffusor-spiral 107b and disc structure, or sediment materials can be collected in a common, or less outlet nozzle(s) when the inner wall along the periphery resembles one or more shortened cones, where a row of nozzle is placed along the periphery where the cone form(s) diameter is biggest. The vacuum pump can be mounted on a slag-tank 124 or connected direct on to the vacuum house with a supply channel (it can be done also with just one disc structure). Power/voltage to the electrodes can be connected bipolar in series or parallel.

Detailed Description of Single Components in the Devise.
Arrangements of the Catalyzers 110, 113, 117, 118a-b, 123

The walls in the split cell 110 and channels 113, 117, 118a-b, 123 could be covered or composed of a row of catalyzers (which could be nickel, copper, zinc, zirconium, platinum, rhodium etc.) which works on hydrocarbon residue to pull out more hydrogen from the hydrocarbon substance and similarly transform/catalyze carbon monoxide to carbon dioxide. Channels area and walls is as following: The inner walls of the cell 110, hydrogen channel 113 to pass the secondary heat exchanger 108, oxygen channels 117, 118a-b (possible carbon dioxide channels), dedicated hydrogen channel 120 to pass the secondary heat exchanger 108, sediment channels 123, 131. The electrodes can also be catalyzic with catalyzers which is especially effective and adapted for the voltage, where the split medium will be ionized and catalyzers on/in the electrodes can for example be nickel or zirconium" or a combination of them, or other catalyzers. Catalyzers can also be adapted to high temperature and pressure.

Ventilation Arrangement 127, 128, 129, 130

By air or gas in the split medium in channel in the axle 122 from the regulating pump nozzle 105 where air can enter, and from sink channels gas may arise in the split medium channels from the periphery, where air/gas channels 128 is connected which ramifies in to a gas pocket chamber 127 in centre of the shaft 122 in the gas pocket chamber 127 there is a float ball 129 (or another adapted valve) which opens to channel 130 when gas/air is in the gas pocked chamber 127 which leads to the inner side of the Zimmer ring for the regulating pump valve 106 where it is low pressure during production, and where cooled liquefied gas is injected from the nozzle, and will therefore drag along gas/air from channel 130 on which they also becomes liquid (when the hydrocarbon gas is enough cooled down and amount) and leads with that down to the split cell 110 where the gas after the electrodes 111 will be separated in to its outlet channels.

Regulation of the Pressure with the Nozzles 114a-b-c

The nozzles 114a-b-c can be adapted for constant gas amount and pressure based on continuously gas production amount, and the pressure in the gases is favourable when the surface of the split medium is held at the corresponding oxygen/$CO_2$ channels 117 on each outer side of the electrodes 111. Or the nozzles can be automatic adjustable for the gas amount but is only open on the said favourable pressure. The pressure at the nozzles 114a-b-c is established by the pressure on the fluid in channels and shaft 122 via the regulating nozzles 105, 106 and the periphery velocity at the surface of the fluid in the cell 110, and the density difference between the fluid and the gas for each channel out and relative gas-pillar pressure (height on the cold gas-pillar with high density from the nozzle against the shaft minus the height on the warmer gas pillar with lower density against the shaft from the cell or oxygen-/$CO_2$-channel 118a).

Primary Heat Exchanger 109 and Secondary Heat Exchanger 108

The execution form of the secondary heat exchanger 108 and the primary heat exchanger 109 can on the outer side be similar and look like a pipe put together in a circle with the same distance to the shaft 122 and in cross section on it and in balance, where the primary heat exchanger 109 lies in a ring just outside the secondary heat exchanger 108 and they can be fastened/anchored to each other, and also be part of binding the structure in the rotating unit together, where it is either a hollow spokes or a massive disc which is fastened/anchored on the inner side of the circle on the secondary heat exchanger 108 and the shaft 122 where supply channels from the shaft could be inside or outside. Or the secondary heat exchanger 108 can be more oval or rectangular on the tangential cross section and where the top (the inner side of the circle) could be fastened directly to the axle. The gas channels 113, 118c, 120 can be taken out on the sides by the top of the secondary heat exchanger 108 on favourable points, where the gases is led along to the nozzles 114 a-b-c.

In the secondary heat exchanger 108 the sink channels from the channel in the shaft 122 with split medium (water/electrolyte) from the pressure regulating nozzle 105 is led in with favourable distribution closest to the shaft, and the outlet for the split medium can be at the bottom (periphery of the secondary heat exchanger 108) and enclose $H_2$ channels where the split medium is led outwards and into the top of the primary heat exchanger 109 where the split medium is pushed down (out towards the periphery) and the same on each outer side of the cell wall 110 to get more even heat exchanging. When the split medium transfers out to the periphery in the heat exchangers 108, 109 the moment of inertia in the tangential acceleration on the split medium makes the tangential speed relative high in the heat exchanger circles 108, 109, which involves a favourable heat exchanging against the gases which moves it self with high speed in a tangential opposite direction, in channels which can be pipe spirals in the secondary heat exchanger 109 and against the wall in the cell 110, which involves efficient heat exchanging from the warm gases to the colder split medium. The same tangential movements will occur of materials moving to and from the periphery other places in the rotating device, as in the cell 110 between the electrodes 111, where the split medium/gases have a high buoyancy velocity towards the shaft, and will following get a relative high tangential speed in the electrode circle 111 and the split medium which pass the electrodes without splitting will flow over the electrodes on the outer side of them, where the split medium moves outwards to the periphery and thereby in tangential opposite direction of the medium between the electrodes 111, these movements is very favourable for the split- and heat exchanging process, which means that the electrodes 111 can be small, and the cell 110 little, but still with high flow through speed and production.

Channels from remaining production gases ($O_2$, $H_2$ from other gas rise channels, CO, $CO_2$ etc.) is led in to the bottom of the secondary heat exchanger 108 on favourable points evenly distributed, and all the gas channels continues in the secondary heat exchanger 108 which can be in multiple pipes separated for each gas component, and the pipes is arranged along the secondary heat exchanger 108 and bended backwards in the rotation direction in a spiral towards the top of the secondary heat exchanger 108, then the gases which will try to remain the periphery speed will be pushed more tangentially along the pipes towards the shaft, which makes the pressure loss of the centrifugal force smaller when they leave the rotation device (nozzles).

Oxygen-/$CO_2$-Channels 118a-b

The execution form (not drawn) on the oxygen/$CO_2$-channels 118a-b can be like that they enclose the primary heat exchanger 109 where the medium in the oxygen/$CO_2$-channels 118a-b is in direct contact with the outer wall on the primary heat exchanger 109. The outer wall on the oxygen/$CO_2$-channels 118a-b is attached in the top (closest shaft) to the outer side (periphery) of the secondary heat exchanger 108 and the primary heat exchanger 109 can be attached together at the bottom, where they also can be closest, also at the bottom of the oxygen channels 118b from each side goes in to a sink channel 123 which now becomes really short, and is more like a row with holes through the primary heat exchanger where in each hole in the oxygen/$CO_2$-channel 118 on the same place along the periphery is mounted a density regulating valve 125 with the following nozzle 114d. Slag outlet channels 131 from both sides of the cell comes out as shown on the figure as a row of channels along the circle of the oxygen/$CO_2$-channel 118b with the same distance to the shaft, the same is concerned for the corresponding oxygen channel 117 and from the exit of them and up, is now a oxygen/$CO_2$-channel 118a, and the outlet channel for the oxygen/$CO_2$ from both sides is most favourable to put in a channel on the top on the same row as the hydrogen channels 113 between the heat exchangers 109, 108 where a row of pipe went from the top of the outer sides wall of the primary heat exchanger 109 and into the secondary heat exchanger 108 where the oxygen/$CO_2$ is leaded along. From the top of the oxygen/$CO_2$-channel's 118a outer wall, there is a row of outlet channels for $H_2$ which is leaded along in to the secondary heat exchanger 108. It can be equal amounts of channel accomplishments for each gas at the periphery of the secondary heat exchanger 108. When oxygen-/$CO_2$-channels enclose the primary heat exchanger 109 it will simultaneous create buoyancy which can be adapted entirely, or partial in balance. The walls between $O_2$/$CO_2$-channels and primary exchanger 109 and between it and the cell 110 can also be relative thin when it's about the same pressure on each side of the walls. This will also improve the heat exchanging. In this case it will be the outer walls on the oxygen/$CO_2$-channels 118a, 118b which becomes most massive to be constructed against the high pressure and the centrifugal forces.

The Nozzles 114a-b-c-d

Every nozzle circle which isn't struck out from the periphery, as for instance slag nozzle 114d, can have a radius in the region between the shaft and out to the same radius as for the slag nozzle 114d. The execution form on the nozzles 114a-b-c can be classical convergent round or square in section in a connected circle against the inner wall on the diffusor-spiral for each gas. Or the nozzles can be like expansion nozzles ("Laval" nozzles), and either chose of the nozzle type, they can be fitted on the sides of the secondary heat exchanger 108 and the primary heat exchanger 109 to bind the structure in the rotating unit together, and/or direct to the shaft 122 where for example Laval nozzles for each gas is placed in a connected circle/disc around the shaft where the nozzle pipes is bend backwards in the rotation direction, and the periphery of the connected nozzle pipes creates a circle where the distance from the shaft is identical, and the outer walls at the periphery of the nozzle pipes is in the same cross section of the shaft, then the section of each outlet will be rectangular. The diameter of the nozzle circle/disc has to be adjusted in proportion to the outlet velocity and the amount of the actual gas and the velocity of the periphery to its nozzle row. On the light gases the out blowing velocity will be many times faster than the velocity of the periphery, so that the resultant velocity on the gas in to the diffusor is going to be relative high. At least on of the nozzle circles 114*a*-*b*-*c* is arranged to push-force in the rotation direction. The material waste nozzle 114*d* could be a row of converging nozzles, of square nozzles favourable placed at the periphery of the rotating device, and which can turn radial from the periphery out to the diffusor-spiral 107*b*.

Diffusor-Spirals 107*b*-*c*-*d*-*e*

The execution form on the diffusor-spirals 107*b*-*c*-*d*-*e*, which is anchored in the vacuum house 101, which does not rotate and that they is arranged around the rotating unit where the outer side of the nozzle wall for each gas, is arranged against the inner side of the diffusor wall to each gas diffusor-spiral with little clearance, and they look like diffusor-spiral to an centrifugal compressor. During gas production, is low pressure formed between each nozzle row (circle) which maintains vacuum/low pressure within the vacuum protection house 101. The diffusor-spirals' purpose is to convert the dynamic pressure (motion pressure) of the gases to static pressure. From the diffusor-spiral 107*b* to the slag nozzle 114*d*, the diffusor-spiral is going to be identical, where the spiral increases in section area with the rotation direction of the rotation device. Diffusor-spirals 107*c*-*d*-*e* can also do this for the other gases if the nozzles are adjusted in a way that the resultant direction on the gases in to the diffusor has the same direction as the rotation device, and if the gases have the opposite direction, the spiral inside the diffusor has to be made the opposite way. The diffusors can be with or without stator blade, which depending on the diffusor radius. And with stator blade they have to be approximately parallel to the track of the gases/particles.

Gas in Liquid or Solid Form (Ice)

Gas in liquid or solid form (ice) is achieved when the gases in the rotating device has the right adjusted temperature and sufficient pressure, where they can be almost in liquid or gas form, and by adjusting the nozzles in adjusted angle to achieve push-force in the rotation direction, the lost energy in the gases by push-force and expansion, involve that both the pressure and temperature will fall in the diffusor-spiral. By precise adjustment, in consideration of critical pressure and temperature for the gases, they can with that become liquid or solid form (ice), or a mixture of this. At the end of the diffusor-spirals it can be arranged a combined pump device which both screw/Pushes and pumps ice/slush/liquid of the gases along to a higher pressure in to modules chambers where the gases can be separated to even cleaner gases in evaporation order by indirectly heating, which can be from hydrocarbons on the way to the injection pump 106, or air/water from the surroundings, where the hydrocarbons in gas form, can become liquid by indirectly heat exchanging with the produced liquid-ice-gases. The modules gas evaporation chambers are pumped up again when the foregoing gases have become separates/evaporates out. The numbers of chambers and the size has to be adjusted for continuous production. In this way, all the gases from the rotating device after heat exchanging, can also be led gathered out to a common diffusor-spiral which leads the materials along to a vertical static cyclone, where solid or liquid material rotates to the bottom as the medium is extruded along and the gases is separated by evaporation chamber as said. And from the top of the said cyclone, cold $H_2$ is extracted by high/low pressure which could be compressed along to an own channel for accumulating or further cooled down and expansion to liquid gas. By-product gases like $CO_2$ could be screwed/pumped out direct to depositing liquefied or it can be allowed heating from the surroundings along for depositing. To achieve a favourable temperature in the gases in the rotating device so they can become liquefied or ice after the diffusor-spiral, it is possible to increase the cooling medium amount/split medium via nozzle 105 where channels leads to a third heat exchanger alike the secondary heat exchanger 108 arranged and attached to it on the inside circle and fastened to the shaft to bind the structure to getter, and with same inlet-/outlet channels as was for secondary heat exchanger 108 each gas channels in the periphery as the periphery of the secondary heat exchanger, only that all of the gas executions is alike as the hydrogen channel 113 from the split cell, namely that all of the gas channels is enclosed of the split medium channel/water channel inside the third heat exchanger the gas pipes could be arranged identical as the secondary heat exchanger 108 and fastened to the shaft and the remaining connections could be like the secondary heat exchanger as said earlier, to bind the rotation structure together. The gas pipes/channels could be taken out on a side or be divided between the sides of the third heat exchanger. Adjusted split medium to splitting in the cell, is supplied in channels to the secondary heat exchanger 108 and further on as said earlier. Superfluous split medium which now is heated up, is led through channels to for example an slip chamber (said earlier), to an shafts end, or via a radial turbine on the shaft, which increases the pressure, and along out to heating use and/or to the floating gases for evaporation of them and the water passing a injector which pulls along supplied water in adjusted amounts for consumption in the rotation device, before the water is pushed in to the rotating device again via the injection nozzle 105.

In addition to the third heat exchanger, or with out it, can the gases in channels after heat exchanging (with water medium as said), where at list one of the gases leads to an other heat exchanger, where cooled down/liquid gas/hydrocarbons from nozzle 106 leads in channels in to the bottom (periphery) of the heat exchanger, where it can be similar as the secondary heat exchanger 108. Heated hydrocarbons can be taken out in a row of channels from top and further to the hydrocarbon distributor 115. The gas channels can also be leaded in to top of the heat exchanger between the outlet to hydrocarbons and outlet at the bottom similar, and gas (es) leads further to each (s) nozzle (s) and diffusor where the gases phase over and separates further as said. In instead of using, or to gathers with said liquid hydrocarbons, can more cooled gases from the process cool down the productions gases from the cell in the same way as said hydrocarbons and inert gas.

It can also be a air cooling channel (not drawn) which ramifies from the shaft end either in or outside it towards the periphery an in to a cooling circle chamber which enclose and is attached to the whole disc structure (except the nozzle circle and the hydrocarbon channel which can be attached on the outside of the cooling circle chamber) with radial plates witch can be bended backwards in the rotation direction where it is supply channels between the said heat exchangers and towards the shaft and the air that is heated, rises up towards it, and can be leaded along out into the shaft end on the opposite side or possible in channel outside of the shaft, and then it can be stator blade which attach the vacuum house to a bearing house with bearings against the shaft, and on the air cooling channel's inlet channel there is a pipe attached and is sealed against the vacuum house which doesn't rotate and encloses the axle. The air cooling channel in the rotating device starts to overlap/enclose with little clearance to the inlet pipe which is attacked to the vacuum house, then at high inlet speed, it will be a low pressure between the pipes, this will also make a low pressure inside the vacuum house 101, and at the air cooling channel's outlet the pipe channels is enclosed opposite to achieve low pressure in to the vacuum house. It can also be added, in adjusted amounts, water-fog in to the air cooling channel's inlet channel so the water evaporates and cools further up inside the air cooling circle chamber and the device. The cooling channel's in- and outlets area can be adapted for a given amount of cooling air. It is also possible to arrange a burn chamber in the inlet to the air cooling circle chamber at the periphery which then becomes a heat circle chamber in those cases where it is needed for heat in the cell. When the heated air out from the air channel can have higher pressure than inn, so can the air execute work by allowing it to pass trough a turbine. This can execute rotation of the device, or other work. The cooling air can also before inlet pas via a compressor for higher effect on the turbine.

The Regulation Nozzle 105, 106 at the Shafts Ends

Execution form and device to the regulation nozzles 105, 106 at the shaft ends, is that they are to be adjusted to further deliver added pressurized split medium to a given gas production amounts by adjusted pressure in the rotation device. In the region between the Zimmer rings (which is attached to the needle nozzle) and the nozzle point, low pressure will be created, which pulls the needle nozzle in to an adjusted and favourable point, and the needle nozzle is in balance to the pressure, by help of adjusted springs with adjustments in the nozzle-housing 105, 106. If the pressure is build up to high in the device, will the nozzle and Zimmer ring be pressed back and simultaneous partly or absolute close the medium through the nozzles, and as the pressure lowers in the device under production, the pressure will be lowered within the Zimmer rings and the nozzles-point 105,106 and it will gradually fall back to the favourable position and increases the injection again. This method gives minimal rotation resistance and wear and tare when the nozzle is not in contact, but not least an automatic mechanical adjustment of the split material to the split cell.

Split Cell 110

The execution form on the split cell 109 goes along and centred in circle of the primary heat exchanger 110 and they are attached to each other at the bottom with along-going cantilevered plates (at the bottom of the slag channel 131) which lies against the hydrocarbon distributor 115 which also is like a pipe (along the circle on the primary heat exchanger 109), which the plates is arranged to, on each side of each top, and there is a row of holes/channels between the arrangement. It is also a row of holes in the aslant plates inside the primary heat exchanger wall 109 so the split medium can pass to the region around the hydrocarbon distributor 115, and further be pushed in to the split cell through the holes between the aslant plate and the hydrocarbon distributor 115. The hydrocarbon distributor is also equipped with a row of holes along the periphery (border) which is adjusted to lead the right amount of hydrocarbon at proper pressure out to the split medium which it will float up in, and together with it through the holes to the split cell 110 between the electrodes 111 which is in the centre as two parallel ring formed plates, which each in the periphery is arranged against the top of each own aslant plates which also the hydrocarbon distributor 115 is attached to on the opposite side of the aslant plates. When the rotating device is electrical conductive, one of the electrodes can be in contact with the structure and the one axle end 112*b* where negative voltage is connected, and the other electrode is electric isolated between the structure, but in contact with an isolated electric conductor to isolated slip ring, at the other shafts end where positive voltage is connected 112*a*. In the event of no electric conductive structure, both of the electrodes has to be added current with electric isolated conductors like the line from 112*a*, which will be alike for the other electrode against the contact 112*b*.

Between the electrodes 111 (in the periphery of them) and the aslant plates which the electrodes is attached to, it is a row of short axial channels to improve the circulation in the cell and to reduce the heat transmission from the electrodes over to the rest of the structure. The electrodes could in advantage be perforated or porous, which is favourable both to improve the heat exchanging, keeps the shape better by heat expansion, but also for bigger contact surface by electrolysis and catalyzing when the electrodes simultaneously is catalytic. The electrodes can be made of an electric conductive material which is highly heat-resistant, corrosion-resistant, low temperature expansion coefficient, in pure metal, alloy, composite, ceramic or nano technology material.

When the split cell 110 will create buoyancy in the split material which surrounds it, it can be constructed to be completely or partially in buoyancy balance at production temperature, to decrease the strains on the structure. Simultaneously the cell walls could be relative thin and by a material which is not electric conductive which will simultaneously send the heat radiation from the cell through the walls to the primary heat exchanger 109 and the split medium on the other side of the wall on its way to the cell.

The hydrocarbon distributor 115 could be shaped in a favourable volume so the buoyancy of it is part of supporting/strengthen the structure inside the primary heat exchanger 109, and at temperature expansion of the electrode discs 111, and it is sufficient flexibility and strength in the anchored-area of them, and that the electrodes 111 at the same time is centred and in balance all the time. The pressure in the hydrocarbon distributor 115 has to be larger than the pressure outside it, so that water and other material aren't forced in to it, but also to supply the cell. But the holes in the hydrogen carbon distributor 115 can have backward valves to prevent the said problems, and then the row of holes in it could be placed any where, but the holes has to be in the same distance from the shaft to get an even flow between them.

At really high pressure and sufficient cool down of the gases after split, they can be liquefied in the rotating unit, which first happens to the heavy gases, for example $CO_2$, which under high pressure and low temperature can it in that case in the $CO_2$-channel 118*a-b* sink out to the periphery in to the density regulating valve 125 and along out through the nozzle 114*d* to the spiral-diffusor 107*b* and accumulated 125 still liquefied and pressurized. Therefore it could be more favourable to keep the temperature enough high to both favourable catalyzing in the $CO_2$-channel 118*a-b* and that the $CO_2$ is led out as said earlier. But by adjusting the production of all gas in the cell, the oxygen channel 118*a-b* could be enclosed by own heat exchangers of each side of the primary heat exchanger, externally alike the others in circle, but internally it is a pipe where the corresponding oxygen-/$CO_2$-channel which is raised on each side to come above the water mirror in the split cell 110 and comes in on the sides in channel in the heat exchanger where the split medium from the nozzle 105 enters from multiple channels at the bottom from the bottom (periphery) along the heat exchanger and is thereafter led in a channel from the top of it to the top of the secondary heat exchanger 108. Simultaneously a channel from the oxygen-/$CO_2$-channel exits through the side of its heat exchanger to a channel which encloses the hydrocarbon channel (said earlier, cooled down) where on the enclosed channel is multiple outlet channels on the top and bottom. Outlet channels on the top leads along $H_2$ residue, which is led directly to the same nozzle row/circle as hydrogen from the hydrogen channel 113, or with the hydrogen channel 113 via adjusted injectors as said, and outlet channels at the bottom (periphery) is leaded directly towards nozzles where the cooled down by-product gases ($CO_2$, CO, $O_2$ etc.) is sinking outwards to the periphery, where they are leaded out as said, at high rotation and under high pressure.

The hydrogen channels 113, 120 could be leaded gathered out via an adjusted injector from channel 113 which at a high pressure sucks along an adjusted amount of hydrogen from the channel 120 with lower pressure, and adapt the pressure in the channel will remains constant so that the necessary water/steam mirror is remained at a favourable point up in the $CO_2$-channel 118a. In this case it can be at least two gas outlet channels.

With only to gas outlet channels, (when both gases is in gas phase) the inlet channels could be leaded in from each shafts end via slip chambers which encloses and is sealed around the shaft where channels on the shaft inside the slip chamber ramifies in to the inlet channel outside the centre of the shaft. At the centre of the axle ends is now going to be equipped with each own needle nozzle attached to the channel where hydrogen in the channel 113+120 (Injected as said above) leads to one of the shafts ends and the oxygen/$CO_2$ channel leads oxygen or $CO_2$ (depending on the production method) to the other shafts end, where it is enclosed a zimmerring on each of the nozzles, which is attached to a adjusted pipe diffusor and the nozzles which can be adjusted to a definite favourable production pressure (said earlier) the gas will be pressed out the needle nozzle on each shaft end with high speed in to the diffusor where the speed is reduced and the static pressure is increased and the gases can be send along as said earlier.

The Suspended Bearings 112a-b

The bearing suspension of the rotating unit can be with roller-, ball-bearing, fluid/gas slide bearing or super conductive electromagnets where it is a seal against the shaft on both sides of the magnets on each of the shaft ends so that it is sealed around the vacuum house and the magnets. Cooling-down the magnets could be allowed with expansion of some of the produced gases or the already cooled-down gases. The construction by the shaft allows the magnet-bearings to have a radial and axial support by one of the shaft ends and can only be radial on the other, this count for all of the bearing choice. The voltage to the electrodes 111 can be put through the super conductive electromagnets with a necessary voltage exchange (which has less meaning to the hydrogen production) and the magnets can with that also be adjusted to be a electric engine or a generator working to either maintain rotation, or produce electricity when it is a high push-force from the gas out of the nozzles to the diffusor-spiral at the periphery and said turbines. At the in- and outlet channels only in the shaft, super conductive magnets could also support each side of the slag nozzle 114d along the periphery of the rotation disc structure for continuous counteract of some of the forces that is applied on the device during rotation and production, so that the rotation speed and pressure on the gases out increases.

While the execution form of the invention illustrated in FIG. 1 separates the produced gases in to multiple channels, the device could be equipped with more channels which allows each gas component separated in to separate channels, fore instance hydrogen-, oxygen, carbon monoxide- and carbon dioxide channels, and the top (closest shaft) of each rise channel to the gases can fine separate out residue of $H_2$ alike the transition from oxygen channels 118a and $H_2$ channel 120 and oxygen (by steam reforming it is more by-product gases) separates out in the oxygen channel (eventually $CO_2$ channel) 118c where the heavy gases is connected along after density, alike as said, and the connections should be before the secondary heat exchanger 108.

The rotation device has to be produced of materials with the essential strength to resist the forces which is created at a high speed rotation. The structure could have in advantage low density to reduce said forces. The structure can be shaped in metal, with the electrodes isolated from the rest of the structure, or from a ceramic material, nano technology material, composite material or a combination of these. The centrifugal forces are determined of the rotation speed and the diameter of the rotating unit, which is adjusted to the forces allowed for the materials which is used.

By steam reforming, pressure and temperature should not be over/under the optimal function limit of the catalyzers which is used.

To reduce the rotation speed and the weights placed on the disc structure, the rotating unit described so far, could increase the pressure of the split fluids at inlet. As following the split unit could be driven on a lower rotation speed which means lower centrifugal force which is applied to the disc structure.

To avoid that the electrodes is disintegrated by crystallization, the polarity of the electrodes could be changed to intervals, and it is not necessary for the gas outlet channels to be exchanged in the device.

The figures must be seen as schematic drawings illustrating the principles of the invention only, and not necessarily showing real world physical realizations of the invention. The invention may be realized using many different materials and arrangements of its components. Such realizations should be within the abilities of any person skilled in the art.

The invention claimed is:

1. A device for producing hydrogen in an electric field, comprising:
a shaft (122) rotationally coupled via bearings (102a, 102b) to a vacuum protection housing (101), which encloses a disc like structure fastened to the shaft (122), which supplies a split medium provided through inlet channels starting at longitudinal ends of the shaft to one or more split cells (110) arranged at a periphery of the disc like structure, wherein each one of the one or more split cells includes first and second electrodes that are supplied with electricity, wherein to the vacuum protection housing are fastened/anchored a plurality of diffusor-spirals (107b-c-d-e) where a produced gas and a material residue from the one or more split cells (110) are provided through a plurality of nozzles (114a-b-c-d), each of which is arranged inside one of the diffusor-spirals with minimal clearance between an outer wall of the nozzle and an inner wall of the associated diffusor-spiral, and wherein a rotation of the disk like structure is supported by a gas pressure generated by the produced gas that is emitted from the nozzles (114a-b-c-d) into the plurality of diffusor-spirals (107b-c-d-e).

2. The device according to claim 1, wherein the device is supplied with hydrocarbons in the split medium.

3. The device according to claim 1, wherein the device is arranged to produce hydrogen, oxygen, and possible carbon dioxide in a liquid state and/or a solid state.

4. The device according to claim 1, wherein the produced gas is emitted in a common outlet channel.

5. The device according to claim 1, wherein the produced gas is fractionated by evaporation.

6. The device according to claim 1, further comprising one or more self-adjusting nozzles (105, 106) arranged in said inlet channels.

7. The device according to claim 1, wherein one of the first and second electrodes is arranged to be in constant electric contact with the disc like structure.

8. The device according to claim 1, wherein to one of the inlet channels is connected one secondary heat exchanger (108) followed by one primary heat exchanger (109) that encloses one of the split cells (110), wherein in an interval space within the primary heat exchanger is arranged a channel that is connected to the secondary heat exchanger (108), from where the split medium presses further toward the periphery on each one of outer sides of the one of the split cells (110), wherein the split medium comes along in to the one of the split cells (110) in the periphery and up between the first and second electrodes (111).

9. The device according to claim 1, wherein an inert gas is supplied to the one of the one or more split cells.

10. The device according to claim 1, wherein a surplus rotation force can be energy transformed.

11. The device according to claim 1, wherein one of the diffusor-spirals is connected to a cyclone-separator.

12. The device according to claim 1, wherein the disc like structure is front-connected and/or back-connected with a cool down arrangement.

13. The device according to claim 1, wherein the disc like structure is connected to at least one turbine.

14. The device according to claim 1, wherein the disc like structure is connected to an electric generator.

15. A method to produce hydrogen using the device of claim 1, comprising:
supplying a split medium to at least one electrolysis cell (110);
rotating the at least one electrolysis cell (110) using a gas produced by the at least one electrolysis cell (110) then cooled down and separated under pressure, wherein the produced gas originating from the at least one electrolysis cell (110) is supplied to at least one of a plurality of nozzles (114 *a-b-c*), and where wherein the at least one electrolysis cell (110) is forced to rotate by the gas pressure from the produced gas emitted from the at least one of a plurality of nozzles (114 *a-b-c-d*).

16. The method according to claim 15, further comprising;
supplying an inert gas to the at least one electrolysis cell (110).

* * * * *